3,073,839
NOVEL PROCESS FOR PREPARING 3-AMINOISOXAZOLE

Hideo Kano, Kamikyo-ku, Kyoto-shi, Ikuo Kikkawa, Nishinomiya-shi, Yasuo Makisumi, Nanatsumatsu, Amagasaki-shi, Shiro Takahashi, Ibaraki-shi, Osaka, and Masaru Ogata, Higashinadaku, Kobe-shi, Japan, assignors to Shionogi & Co., Ltd., Osaka-shi, Japan
No Drawing. Filed Sept. 14, 1959, Ser. No. 839,580
Claims priority, application Japan Sept. 20, 1958
3 Claims. (Cl. 260—307)

This invention relates to novel process for preparing 3-aminoisoxazole.

Up to the present time, though methods for preparing 4- or 5-aminoisoxazole have been reported, there are, according to our knowledge and belief, only two reports concerning the preparation of 3-aminoisoxazole, which were reported by Quilico et al. (Gazz. Chim. Ital. 76, 255–264 (1946)) and by the inventors of this invention. (Annual Report of Shionogi Research Laboratory, 7, 1 (1957).) From the viewpoint of chemical industry, these processes have enormous disadvantages, since the said preparation employs the Curtius Reaction, in which it is not avoidable to pass through fulminant azide, and moreover the total yield of the preparation is low.

In the novel process of this invention such industrial defects are obviated completely as the novel process of this invention comprises applying the Hofmann Reaction to isoxazole-3-carboxylic amide to afford 3-aminoisoxazole in excellent yield and in high purity. Although the Hofmann Reaction has been well known from former times as an effective amination reaction, it has never been applied to isoxazole compounds.

Accordingly, it is an object of this invention to provide a quite novel process for preparing 3-aminoisoxazole, having practical utility in chemical industry, particularly in pharmaceutical industry.

The process of this invention may be illustrated by the following formulas:

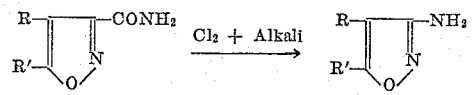

wherein R and R', when individual, represent hydrogens, alkyl, aryl or alkaryl groups, and, when linked together, represent a saturated or unsaturated hydrocarbon bridge.

Generally stated, isoxazole-3-carboxylic amide is treated with chlorine and alkali as illustrated above to afford the objective amine in excellent yield. Alternatively, when the intermediate, such as halogenoamide or urethane, is obtained, still another treatment with alkali is necessary.

As the reaction solvent, water, alcohol or the like may be employed. According to the employed reaction solvent, a suitable reaction agent should be selected: for instance, in the case of employing aqueous solvent a combined agent of chlorine and alkali, such as sodium hydroxide or a single agent, such as alkali hypochlorite or chloride of lime, and in the case of employing alcoholic solvent a combined agent of chlorine and alkali metal or alkali-alcoholate is generally used, respectively.

The reaction is carried out by heating isoxazole-3-carboxylic amide with the agent in a suitable reaction solvent. According to the kind of solvents, sometimes, the intermediate, halogenoamide or urethane, may be obtained as main product. Such intermediate is easily transformed to the objective amine by heating with alkali either after isolating it or without isolation.

Consequently, all of the specific forms of the Hofmann Reaction, without departing from the spirit or essential characteristics thereof, are within the scope of this invention.

The product of this invention, 3-aminoisoxazole, is a particularly valuable compound in the preparation of effective sulfonamide derivatives. For example, condensing with p-aminobenzenesulfonyl chloride, sulfisoxazole which is one of the most effective sulfa-drugs, is afforded.

The following examples will illustrate the synthesizing procedure in further detail, but they are presented by way of illustration only and not as indicating the scope of the invention.

EXAMPLE I

*3-amino-5-methylisoxazole.*—Keeping the temperature at 26–8° C., to a solution of 12.6 g. of 5-methylisoxazole-3-carboxylic amide in 100 cc. of methanol, 149 g. of 6% sodium hypochlorite solution containing 4 g. of sodium hydroxide were added dropwise with stirring. After the addition, the mixture was stirred at the same temperature for 1 hr., and then at 78–80° C. for 3 hrs. To the mixture a solution of 12 g. of sodium hydroxide in 24 cc. of water was added dropwise, and the mixture was refluxed for 7 hrs. After removing the solvent, the aqueous solution was extracted with chloroform, and the extract was dried. After removing chloroform, the residue was crystallized on standing. Thus 7.8 g. of crude 3-amino-5-methylisoxazole were obtained.

EXAMPLE II

*3-amino-5-methylisoxazole.*—With ice-cooling 8 g. of sodium hydroxide were added to 165 cc. of 10% sodium hypochlorite solution with stirring, and then 25.2 g. of 5-methylisoxazole-3-carboxylic amide were added bit by bit. After stirring for 0.5 hr. at room temperature, the mixture was added dropwise to 50 cc. of boiling water, and then heated for 1 hr. more with stirring. After cooling, the mixture was extracted with chloroform, and the extract was dried. After removing the solvent, 16.4 g. of crude 3-amino-5-methylisoxazole were obtained.

In this procedure, when 40 cc. of 20% sodium hydroxide solution were employed instead of 50 cc. of boiling water, almost the same weights of the compound were obtained.

EXAMPLE III

*3-amino-5-methylisoxazole.*—In 150 cc. of 10% of sodium hypochlorite solution, 8.0 g. of sodium hydroxide were dissolvevd, and 25.2 g. of 5-methylisoxazole-3-carboxylic amide were dissolvevd bit by bit. The mixture was boiled for 10 min. and heated 1 hr. more without boiling. After cooling, the mixture was extracted with chloroform, and the extract was dried. Removing the solvent, 16.0 g. of 3-amino-5-methylisoxazole were obtained.

EXAMPLE IV

*N-chloro-5-methylisoxazole-3-carboxylic amide.*—To a solution of 8.5 g. of sodium hydroxide in 10 cc. of water another solution of 25.2 g. of 5-methylisoxazole-3-carboxylic amide in 116 cc. of 14.2% sodium hypochlorite was added gradually, and stirred. After becoming clear, the mixture was poured onto ice and 30 cc. of conc. HCl, extracted with chloroform, and the extract was dried. After removing the solvent, 22.5 g. of N-chloro-5-methylisoxazole-3-carboxylic amide were obtained, M.P. 123.5–4.5° C. (recrystallizing from methanol-water).

*Analysis.*—Calcd. for $C_5H_5O_2N_2Cl$: C, 37.39; H, 3.12; N, 17.45. Found: C, 37.75; H, 3.16; N, 16.76.

EXAMPLE V

*3-amino-5-methylisoxazole.*—12.5 g. of N-chloro-5-methylisoxazole-3-carboxylic amide were added to a solution of 3.5 g. of sodium hydroxide in 100 cc. of water, and the mixture was added dropwise to a boiling solution of 9 g. of sodium hydroxide in 60 cc. of water. After the addition, the mixture was boiled for 1.5 hrs. more, cooled, extracted with chloroform, and the extract was dried. After removing the solvent, 6 g. of 3-amino-5-methylisoxazole were obtained. From the mother liquor of the former extraction 0.7 g. more of the product was recovered.

EXAMPLE VI

*3-amino-5-ethylisoxazole.*—28 g. of 5-ethylisoxazole-3-carboxylic amide were added to a mixture of 149 cc. of 10% sodium hypochlorite solution and 8 g. of sodium hydroxide. The same treatment as that of Example II gave 16 g. of 3-amino-5-ethylisoxazole, M.P. 71–2° C.

*Analysis.*—Calcd. for $C_5H_8ON_2$: C, 53.57; H, 7.14; N, 25.00. Found: C, 53.75; H, 7.22; N, 24.64.

EXAMPLE VII

*3-amino-5-phenylisoxazole.*—18.8 g. of 5-phenylisoxazole-3-carboxylic amide were added to a mixture of 4.5 cc. of 10% sodium hypochlorite solution and 8 g. of sodium hydroxide. The same treatment as that of Example II gave 12 g. of 3-amino-5-phenylisoxazole, M.P. 139–9.5° C.

EXAMPLE VIII

*3-amino-4,5-tetramethylene-isoxazole.*—10.0 g. of 4,5-tetramethylene-isoxazole-3-carboxylic amide were added to a mixture 49 g. of 10% sodium hypochlorite solution and 4 g. of sodium hydroxide. The same treatment as that of Example II gave 7.5 g. of 3-amino-4,5-tetramethylene-isoxazole, M.P. 139° C. (recrystallizing from water).

*Analysis.*—Calcd. for $C_7H_{10}ON_2$: C, 60.85; H, 7.30; N, 20.28. Found: C, 60.87; H, 7.47; N, 20.08.

Having thus described our invention, we claim:

1. A process for preparing 3-aminoisoxazoles of the formula

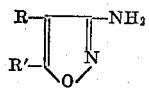

wherein R and R', when considered as discrete radicals, are each a member selected from the group consisting of methyl, ethyl and phenyl radicals and, when linked together, form a tetramethylene bridge, consisting essentially of mixing gradually the corresponding n-chlorinated isoxazole-3-carboxylic amide with a reagent consisting essentially of alkali, heating the resulting mixture to boiling for from about 1 to 3 hours, and adding chloroform, thereby extracting the resulting 3-aminoisoxazole from the reaction mixture.

2. In a process for preparing 3-aminoisoxazole of the formula

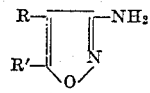

wherein R and R', considered as discrete radicals, are each a member selected from the group consisting of methyl, ethyl and phenyl radicals and, when linked together, form a tetramethylene bridge, the improvement consisting of mixing (a) isoxazole 3-carboxylic amide of the formula:

wherein R and R' have the same meaning as stated above with (b) a reagent consisting essentially of chlorine and alkali, by gradually adding one of the reactants (a) and (b) to the other, and then boiling the resulting mixture.

3. A process according to claim 2 wherein the reagent is sodium hypochlorite and sodium hydroxide.

References Cited in the file of this patent

Freri: Gazz. Chim., Ital., vol. 62, pp. 459–463 (1932).
Quilico: Chem. Abstracts, vol. 33, cols. 1728–1730 (1939).
Adams: Organic Reactions, vol. III, pp. 268; 279–285 (1946).
Quilico et al.: Chem. Abstracts, vol. 42, col. 1262 (1948).